(12) United States Patent
Ito et al.

(10) Patent No.: US 10,794,874 B2
(45) Date of Patent: Oct. 6, 2020

(54) SAMPLE INJECTION DEVICE

(71) Applicant: HITACHI HIGH-TECHNOLOGIES CORPORATION, Tokyo (JP)

(72) Inventors: Shinya Ito, Tokyo (JP); Shigeo Muto, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 216 days.

(21) Appl. No.: 15/730,936

(22) Filed: Oct. 12, 2017

(65) Prior Publication Data
US 2018/0038837 A1  Feb. 8, 2018

Related U.S. Application Data

(62) Division of application No. 14/651,247, filed as application No. PCT/JP2013/078407 on Oct. 21, 2013, now abandoned.

(30) Foreign Application Priority Data

Dec. 19, 2012 (JP) .................................. 2012-276356

(51) Int. Cl.
*G01N 30/20* (2006.01)
*G01N 30/24* (2006.01)
(Continued)

(52) U.S. Cl.
CPC .............. *G01N 30/20* (2013.01); *G01N 30/24* (2013.01); *G01N 35/08* (2013.01);
(Continued)

(58) Field of Classification Search
CPC .............................. G01N 30/20; G01N 30/24
See application file for complete search history.

(56) References Cited

U.S. PATENT DOCUMENTS 3,504,799 A    4/1970  Ogle
3,918,913 A *  11/1975 Stevenson .............. G01N 30/24
                                                  73/863.72
(Continued)

FOREIGN PATENT DOCUMENTS

CN    85 1 04251 A    12/1986
CN     1240936 A       1/2000
(Continued)

OTHER PUBLICATIONS

International Search Report of PCT/JP2013/078407.
(Continued)

*Primary Examiner* — Matthew D Krcha
(74) *Attorney, Agent, or Firm* — Mattingly & Malur, PC (57) ABSTRACT

Provided herein is a sample injection method that enables efficient injection of a trace sample solution while reducing the measurement time. A sample solution is injected into a sample loop with air layers disposed on both sides of the sample solution, and the total amount of the sample solution, including the air layers, is injected into a detector. The start and the end of data collection are determined from the detection signal intensity changes that occur upon the air layers being injected into the detector, and the velocity of the flowing liquid is increased to reduce the measurement time. A washing solution is injected after the air layer to improve the washing efficiency and reduce the washing time.

11 Claims, 4 Drawing Sheets

(51) Int. Cl.
    *G01N 35/08*  (2006.01)
    *H01J 49/04*  (2006.01)
    *G01N 30/72*  (2006.01)
    *G01N 30/00*  (2006.01)

(52) U.S. Cl.
    CPC ...... *H01J 49/0431* (2013.01); *G01N 30/7233* (2013.01); *G01N 30/7266* (2013.01); *G01N 2030/009* (2013.01); *G01N 2030/207* (2013.01)

(56) References Cited

U.S. PATENT DOCUMENTS

| | | | |
|---|---|---|---|
| 4,311,484 A * | 1/1982 | Fosslien | G01N 35/00 422/561 |
| 4,806,250 A * | 2/1989 | Takata | B01D 15/1871 210/198.2 |
| 4,957,009 A | 9/1990 | Nohl et al. | |
| 5,134,445 A * | 7/1992 | Toge | G01N 15/1404 356/246 |
| 5,738,783 A | 4/1998 | Shirota et al. | |
| 6,063,283 A | 5/2000 | Shirota et al. | |
| 6,136,195 A * | 10/2000 | Taylor | B01D 15/203 210/198.2 |
| 2012/0024048 A1 * | 2/2012 | Maeda | G01N 30/20 73/61.55 |

FOREIGN PATENT DOCUMENTS

| | | |
|---|---|---|
| CN | 102369434 A | 3/2012 |
| JP | 62050659 A | 3/1987 |
| JP | 2-132369 A | 5/1990 |
| JP | 7-159415 A | 6/1995 |
| JP | 7-311187 A | 11/1995 |
| JP | 2573678 B2 | 10/1996 |
| WO | 2010/119801 A1 | 10/2010 |

OTHER PUBLICATIONS

Chinese Office Action received in corresponding Chinese Application No. 201380066520.6 dated Aug. 23, 2016.

Extended European Search Report received in corresponding European Application No. 13865867.9 dated Sep. 2, 2016.

* cited by examiner

SAMPLE INJECTION DEVICE

CROSS REFERENCE TO RELATED APPLICATION

This application is a divisional application of U.S. Application Serial No. 14/651,247, filed Jun. 11, 2015, the entirety of the contents and subject matter of all of the above is incorporated herein by reference.

TECHNICAL FIELD

The present invention relates to a sample injection device that injects a sample into a mass spectrometer, and particularly to a sample injection device for mass spectrometers that uses a flowing solvent for the injection of a sample solution by a flow injection method.

BACKGROUND ART

A mass spectrometer (MS) is an analyzer used for high-sensitivity measurements of trace chemical species components contained in liquid or gas components. Mass spectrometers are used for the qualitative and quantitative analyses of trace chemical species contained in various types of sample solutions such as biofluids (e.g., serum, urine, and tissue extract), and environmental samples (e.g., river water, and industrial drainage water).

MS measurements of a solution sample commonly use a LC-MS or a CE-MS with a sample injection device connected online to separating means such as a high performance liquid chromatograph (HPLC) and a capillary electrophoresis (CE) device. In separating means such as LC and CE, a sample solution is injected into a continuous stream of a solvent in a flow path. The target chemical species in the sample solution are separated from contaminating components at a separating unit disposed downstream of the flow path, and injected into the MS. The chemical species injected in the MS are ionized by an ionization source, and separated and detected according to the mass. The ionization source used to ionize the target chemical species in MS uses atmospheric ionization as represented by electrospray ionization (ESI). The MS connected online to the separating means involves separation of the target chemical species from contaminating components, and enables high sensitivity and high accuracy analysis.

In the analysis of biofluids, the sample solution is usually available only in trace amounts. A trace sample solution can be injected into LC-MS by using a method that measures the sample solution by filling it in a small-volume sample loop. However, the method requires the sample solution in several times the volume of the sample loop. In another method, a syringe installed in a sample injection device is used to measure and inject a sample solution into a sample loop. However, the sample solution becomes diluted during the injection process as it mixes with the solvents disposed on the both sides of the sample solution, and the liquid amount with the measurement component increases. The lowered concentration of the measurement component leads to poor detection sensitivity in concentration-dependent detectors such as MS, and causes a proportional increase in measurement time.

As a means to efficiently inject a trace sample solution into a HPLC or a LC-MS, a method is proposed in which a sample solution is sent to a sample loop by being sandwiched between bubbles to reduce the dilution of the sample solution by solvent. For example, PTL 1 and PTL 2 describe sandwiching a sample solution between bubbles, and sending only the sample solution to a sample loop to reduce the loss by the diffusion of the sample solution.

Flow injection analysis (FIA) is a non-separatory technique that enables quick analysis. FIA is an analytical method in which a reaction reagent solution is constantly passed through a capillary of about 0.5 mm, and a solution sample is injected into the continuous stream to detect the reaction product chemical species or derivatives thereof of interest with a downstream detector (see, for example, Non PTL 1 and PTL 2). The advantages of FIA include the low cost of the analyzer, simple procedures for fast and high sensitivity measurements, and easy automation. The detection commonly uses an spectrophotometer. However, FIA-MS that uses MS is also used in applications that require high sensitivity analysis, for example, such as in environment detection, and measurements of biological components. For the injection of a trace liquid sample in FIA, for example, PTL 3 describes a method in which a sample solution and air are alternately disposed in a capillary, and these are injected into a detector flow cell to reduce the diffusion of the sample solution or the dilution by washing solution as might occur during the injection.

CITATION LIST

Patent Literature

PTL 1: JP-A-62-50659
PTL 2: Japanese Patent No. 2573678
PTL 3: JP-A-7-159415

Non Patent Literature

NPL 1: H. B. Kim et al.; Analytical Science, 16, 871-876, 2000.
NPL 2: K. Kameyama et al.; Biophysical Journal, 90, 2164-2169, 2006.

SUMMARY OF INVENTION

Technical Problem

The separation capability of LC-MS and CE-MS suffers when bubbles enter the separation unit where column separation or electrophoresis takes place. In this case, electrophoresis can no longer be performed properly, and a problem is posed for the analysis. PTL 1 and PTL 2 address this problem by not retaining the bubbles on the both sides of the sample solution in a sample loop so as to prevent entry of the bubbles in the analysis flow path. This means that the sample solution is partially present also on the outside of the sample loop, and that this portion of the sample solution on the outside of the sample loop becomes washed and wasted without being used for analysis. PTL 3 achieves efficient displacement of a sample solution. However, the sample solution sandwiched between air layers is also not used for analysis, and wasted.

It is accordingly an object of the present invention to provide a sample injection method for MS whereby a trace sample solution can be fully injected while also reducing the measurement time.

Solution to Problem

In order to achieve the foregoing object, the present invention provides a sample injection device that is configured from sample drawing means, a sample loop, flow path switching means, and solvent delivering means, and that injects a sample into a detector in a stream of a solvent. The sample is drawn and injected into the sample loop with air layers disposed on both sides of the sample, and the total sample amount, including the air layers, is injected into the detector.

Advantageous Effects of Invention

The present invention uses air layers that are disposed on both sides of a sample. This reduces the sample diffusion in the flow path, and increases the signal intensity of the sample at a detecting section. Signal intensity changes due to the air layer are detected to enable an easy transition to the washing step, and the measurement time is reduced.

DESCRIPTION OF EMBODIMENTS

Embodiments of the present invention are described in detail below. It should be noted that the present invention is in no way limited by the following embodiments.

First Embodiment

An automatic analyzer according to an embodiment of the present invention is described below with reference to FIG. 1. Specifically, an automatic analyzer is described that is intended to automatically and continuously analyze trace components contained in biofluids such as serum and urine, and that includes a solid phase extracting mechanism for performing solid phase extraction as a pretreatment, a sample injection device for passing an extracted sample solution, and a MS equipped with an ESI ionization source. More specifically, the following describes an example of an analysis of the immunosuppressant tacrolimus contained in a whole blood sample.

Figure 1:
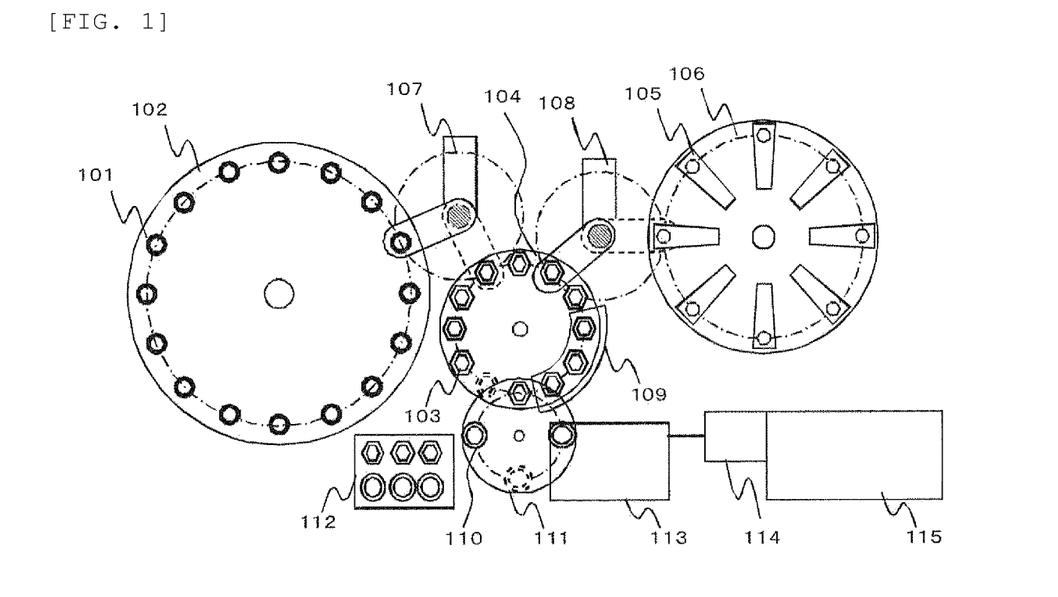
FIG. 1 is a diagram representing the configuration of an automatic analyzer according to an embodiment of the present invention.

The automatic analyzer shown in FIG. 1 is configured from a sample holder 102 on which sample containers 101 with a dispensed biofluid to be subjected to a solid phase extraction process are disposed; a processing section 104 that sequentially performs a solid phase extraction process with a solid phase extraction cartridge 103; a reagent installation unit 106 on which reagent containers 105 for various reagents such as a washing solution 203 and an eluent used for an extraction process are disposed; a sample dispensing mechanism 107 by which the biofluid dispensed in the sample container 101 is dispensed into the solid phase extraction cartridge 103; a reagent dispensing mechanism 108 by which the reagent in the reagent container 105 is dispensed into the solid phase extraction cartridge 103; a solid phase extraction processing section 109 that performs a solid phase extraction process; a extract container holder 111 on which extract containers 110 are disposed; a holder 112 for expendables such as the solid phase extraction cartridge 103 and the extract container 110; a sample injection section 113 that dispenses the extracted sample solution in the extract containers 110, and passes the extracted sample solution to an ionization source 114; and a mass spectrometry section 115 in which the components ionized in the ionization source 114 are subjected to mass spectrometry.

The biofluid analysis procedures by the automatic analyzer are described below. A predetermined quantity of the biofluid dispensed in the sample container 101 on the sample holder 102 is dispensed into the solid phase extraction cartridge 103 with the sample dispensing mechanism 107. The solid phase extraction cartridge 103 with the dispensed biofluid is moved by the rotation of the processing section 104 to the position of the solid phase extraction processing section 109. In the solid phase extraction processing section 109, a liquid is passed in the solid phase extraction cartridge 103 containing the dispensed sample. By this process, the dispensed sample is passed in the solid phase extraction cartridge, and the measurement target component becomes retained in the solid phase of the solid phase extraction cartridge 103. The washing solution 203 prepared in the reagent container 105 is then dispensed into the solid phase extraction cartridge 103 with the reagent dispensing mechanism 108, and is passed to wash the solid phase extraction cartridge 103. After the washing, the reagent dispensing mechanism 108 dispenses the eluent into the solid phase extraction cartridge 103 containing the dispensed sample, and the eluent is passed to elute the measurement target component retained in the solid phase of the solid phase extraction cartridge 103. The resulting liquid is then collected into the extract container 110 as an extracted sample solution.

The extract container 110 with the collected extracted sample solution is moved to the position of the sample injection section 113 by the rotation of the extract container holder 111. The extracted sample solution in the extract container 110 is injected into the ionization source 114 with the sample injection section 113. The measurement target component is ionized in the ionization source 114, and the component is detected in the mass spectrometry section 115.

Figure 2:
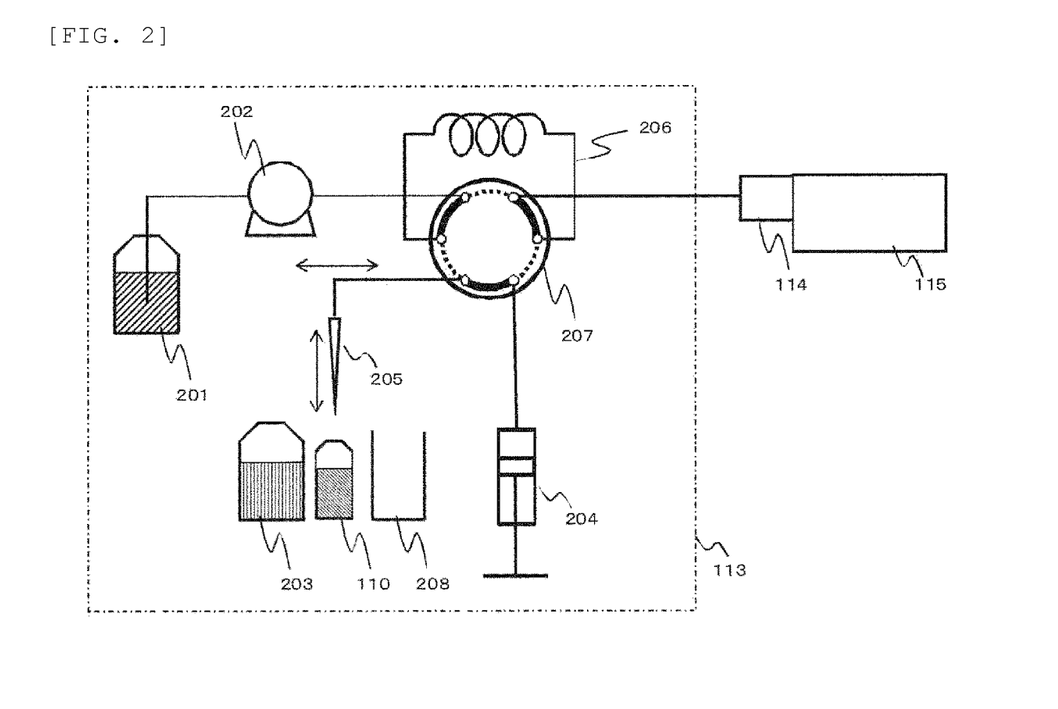
FIG. 2 is a diagram representing the flow path in a sample injection section according to the embodiment of the present invention.

The sample injection section 113 is described below in detail with reference to FIG. 2. The sample injection section 113 is configured from a passing pump 202 that delivers a flowing solvent 201; a syringe pump 204 that draws the extracted sample solution in the extract container 110, and the washing solution 203; a needle 205 that draws and sends the extracted sample solution and the washing solution 203 to the flow path; a sample loop 206 that retains the drawn extracted sample solution; a flow path switching valve 207 that connects the passing pump 202, the syringe pump 204, the needle 205, and the both ends of the sample loop 206 to the ionization source 114, and is adapted to switch the flow path to pass the retained extracted sample solution in the sample loop 206 to the ionization source 114; and a waste receptacle 208 that collects the liquid ejected from the needle 205. FIG. 2 also shows the mass spectrometry section 115 that detects the components ionized in the ionization source 114.

The flow path switching valve 207 has six connection ports, and is adapted to switch the flow paths by connecting any two adjacent ports. The flow path switching valve 207 has two switchable flow paths, Inject and Load. Referring to FIG. 2, Inject is the flow path indicated by solid line. Switching the flow path to Inject creates a state in which the passing pump 202 and the sample loop 206, the sample loop 206 and the ionization source 114, and the needle 205 and the syringe pump 204 are connected to each other. Load is the flow path indicated by dotted line in FIG. 2. The needle 205 is moved to dip the needle tip portion into either the extracted sample solution collected into the extract container 110, or the washing solution 203, and the liquid is drawn into the needle 205 by the operation of the syringe pump 204. The needle 205 is also moved to the position of the waste receptacle 208 to eject the liquid inside the needle 205 and the flow path.

Figure 3:
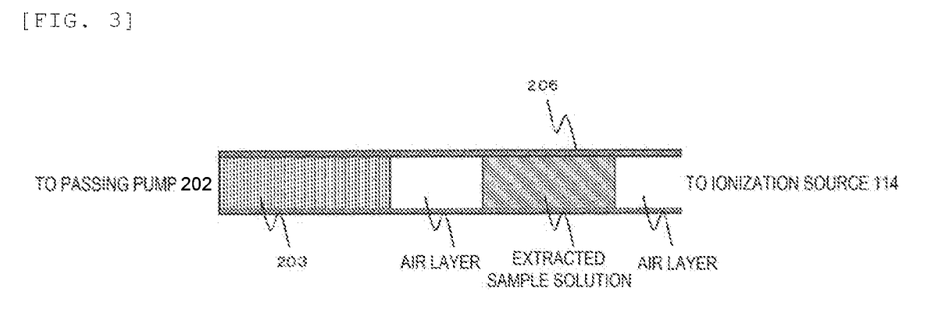
FIG. 3 is a schematic diagram representing inside of a sample loop with the injected extracted sample solution and air layers.

The operation of the sample injection section 113 according to the present embodiment is described below with reference to FIGS. 2 and 3. The sample injection section 113 is in a standby state until it receives the extract container 110 containing the extracted sample solution, and the passing pump 202 passes the flowing solvent 201 to the ionization source 114 at a predetermined flow rate. Here, the flow path switching valve 207 switches the flow path to Inject position, and the flowing solvent 201 is passed to the ionization source 114 through the sample loop 206. The syringe pump 204 repeats the drawing and the ejection of the washing solution 203 into the waste receptacle 208 to fill the flow path between the syringe pump 204 and the needle 205 with the liquid (washing solution 203) and remove the air.

The sample injection operation into the sample injection section 113 is started upon the extract container 110 with the collected extracted sample solution being sent to the sample injection section 113 in a standby state. First, the flow path switching valve 207 switches the flow path from Inject to Load (dotted line in FIG. 2). This connects the syringe pump 204 and the needle 205 with the sample loop 206 in between. The needle 205 is then moved to above the extract container 110 where there is no liquid, and the syringe pump 204 performs a certain draw operation to draw air into the needle 205 through the needle tip (first air layer). The needle 205 is lifted down to move the tip into the extracted sample solution, and the syringe pump 204 performs a certain draw operation to draw the extracted sample solution into the needle 205 through the needle tip. The needle 205 is then lifted up to move the tip out of the extracted sample solution, and the syringe pump 204 performs a certain draw operation to draw air into the needle 205 through the needle tip (second air layer). The tip of the needle 205 is then moved into the washing solution 203, and the syringe pump 204 performs a certain draw operation. This draws the washing solution 203 into the needle 205 through the needle tip, and, at the same time, injects the extracted sample solution between the two air layers into the sample loop 206. FIG. 3 is a schematic diagram inside the sample loop 206 after the sample injection operation.

After the sample injection operation, the flow path switching valve 207 switches the flow path from Load to Inject, and the extracted sample solution is sent to the ionization source 114 by the operation of the passing pump 202. Each component in the extracted sample solution is ionized in the ionization source 114, and sent to the mass spectrometry section 115. In the mass spectrometry section 115, the ionized components are separated for detection according to mass-to-charge (m/z).

Figure 4:
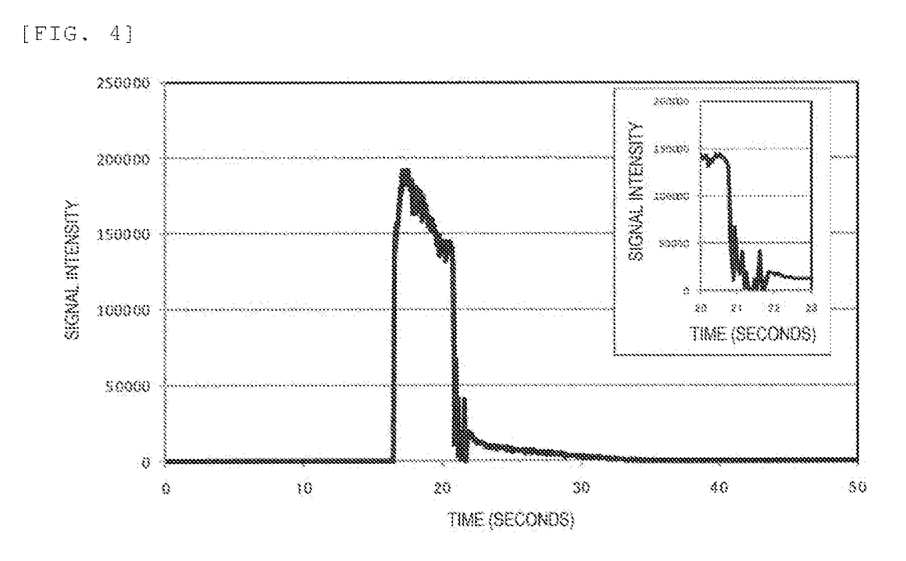
FIG. 4 is a diagram representing the measurement result according to the embodiment of the present invention.

FIG. 4 represents the time dependent changes in the signal intensity detected in the mass spectrometry section 115 according to the present embodiment. In FIG. 4, the horizontal axis represents the time after the switching of the flow path to Inject by the flow path switching valve 207, and the vertical axis represents the signal intensity of the ionized tacrolimus. A 70% methanol aqueous solution containing 10 mmol/L of ammonium acetate was used as the flowing solvent 201. The passing pump 202 had a flow rate of 100 µL/min, and the sample loop 206 had a 60 µL volume. The sample injection operation injected the first air layer (5 µL), the extracted sample solution (injected in 10 µL), the second air layer (15 µL), and the washing solution 203 (2-propanol, 30 µL) into the sample loop 206.

The tacrolimus contained in the extracted sample solution was detected in the mass spectrometry section 115 after about 16 seconds from the switching of the flow path by the flow path switching valve 207, and the signal intensity increased almost vertically. The signal intensity showed a rapid decrease after about 21 seconds from the switching of the flow path, and the count reached zero. Another signal was immediately detected, and the signal became gradually weaker over the course of about 10 seconds until it was finally undetectable after about 35 seconds from the switching of the flow path. The signal detected in the 6 second period from 16 seconds to 21 seconds after the switching of the flow path is attributed to the extracted sample solution between the two air layers. The signal detected after 22 seconds from the switching of the flow path is due to the extracted sample solution that remained in the sample loop 206, the ionization source 114, and the pipe, and washed by the washing solution 203.

The rapid increase or decrease of signal intensity is due to two air layers disposed on the both sides of the extracted sample solution, preventing the extracted sample solution from being mixed and diluted with the flowing solvent 201 or the washing solution 203. While the air layer is passing the ionization source 114, the extracted sample solution does not exist in the ionization source 114, and accordingly the signal intensity count was zero. A quantitative analysis of components from mass spectrometry signals typically uses the integration value of the signal intensity, specifically the peak area. A further reduction of the measurement time can be achieved by using the 0 count time of signal intensity as the reference point of a peak area in the waveform of the signal intensity obtained in the present embodiment. Specifically, the time needed to wash the flow path can be reduced by increasing the flow rate of the passing pump 202 and the velocity of the flowing solvent 201 at the time when the signal intensity has decreased to the zero count. Changing the flow rate of the passing pump 202 changes the ionization efficiency in the ionization source 114, and the signal intensity obtained in the mass spectrometry section 115 fluctuates. However, this does not affect the result of quantification because the peak area calculations only use the signal intensity from the zero count signal intensity (air layer) to the signal intensity that has decreased to 0 count.

Figure 5:
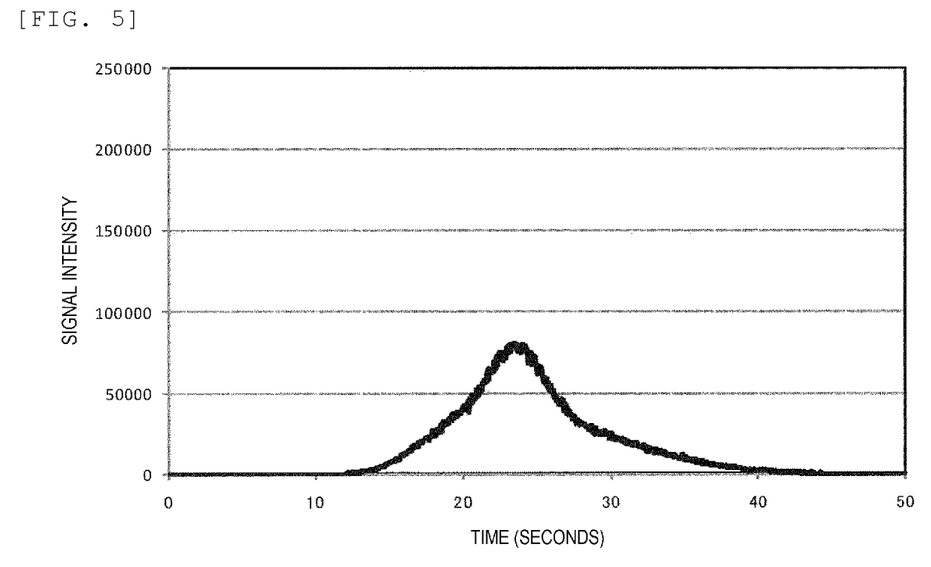
FIG. 5 is a diagram representing the measurement result according to a conventional method.

For comparison, FIG. 5 represents a conventional sample injection method performed under the same measurement conditions as in the present embodiment except for the absence of the two air layers. Specifically, FIG. 5 represents the time dependent signal intensity changes when the extracted sample solution is passed to the ionization source 114 in contact with the flowing solvent 201 and the washing solution 203. As shown by the peak waveform in FIG. 5, the signal intensity gradually increased after about 10 seconds from the switching of the flow path, and became the maximum after about 24 seconds before the signal became undetectable after about 45 seconds. By comparing the measurement results of FIG. 4 and FIG. 5, the signal intensity obtained in the result presented in FIG. 4 of the present embodiment was at least two times as strong as that shown in FIG. 5, and the signal intensity of the component became undetectable about 10 seconds earlier.

Second Embodiment

Another embodiment of the present invention is described below with reference to FIGS. 6 and 7.

Figure 6:
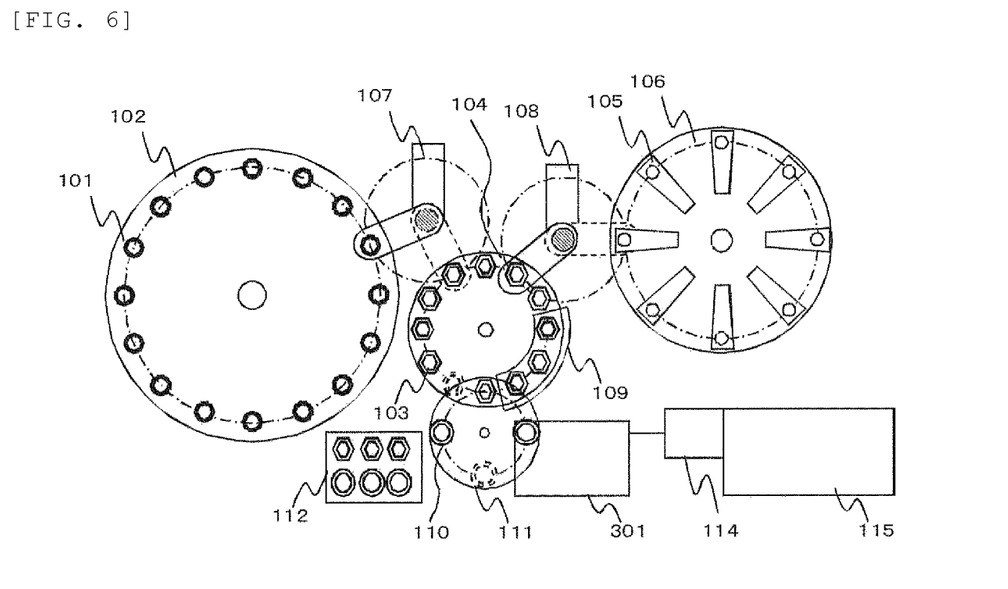
FIG. 6 is a diagram representing the configuration of an automatic analyzer according to another embodiment of the present invention.

FIG. 6 shows an automatic analyzer that is intended to automatically and continuously analyze trace components contained in biofluids such as serum and urine, and that includes a solid phase extracting mechanism for performing solid phase extraction as a pretreatment, a sample injection device for passing an extracted sample solution, and a MS equipped with an ESI ionization source. More specifically, FIG. 6 represents an example of an analysis of the immunosuppressant tacrolimus contained in a whole blood sample. The difference from First Embodiment is the configuration of a sample injection section 301, and the other configuration is the same as in First Embodiment.

Figure 7:
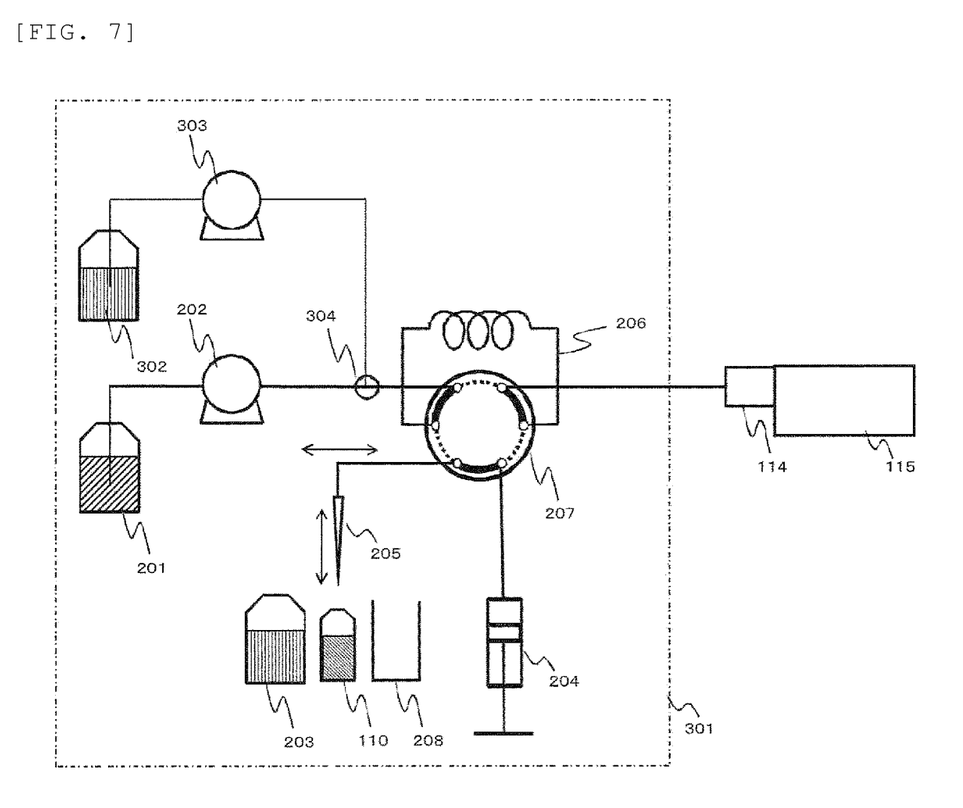
FIG. 7 is a diagram representing the flow path in a sample injection section according to another embodiment of the present invention.

FIG. 7 is a detailed diagram of the sample injection section 301. The sample injection section 301 is configured from a passing pump 202 that delivers a flowing solvent 201; a syringe pump 204 that draws the extracted sample solution in the extract container 110, and the washing solution 203; a needle 205 that is placed in the extracted sample solution and the washing solution 203 when drawing these solutions; a sample loop 206 that retains the drawn extracted sample solution; a flow path switching valve 207 that connects the passing pump 202, the syringe pump 204, the needle 205, and the both ends of the sample loop 206 to the ionization source 114, and is adapted to switch the flow path to pass the retained extracted sample solution in the sample loop 206 to the ionization source 114; a waste receptacle 208 that collects the liquid ejected from the needle 205; a washing pump 303 that delivers the washing solution 302; and a three-way joint 304 that connects the flow path between the passing pump 202, the washing pump 303, and the flow path switching valve 207. FIG. 7 also shows the mass spectrometry section 115 that detects the components ionized in the ionization source 114. The configuration of the flow path switching valve 207 is the same as in First Embodiment.

The operation of the sample injection section 301 according to the present embodiment is described below. The sample injection section 301 is in a standby state until the sample injection section 301 receives the extract container 110 containing the extracted sample solution, and the passing pump 202 passes the flowing solvent 201 to the ionization source 114 at a predetermined flow rate. The washing pump 303 remains inactivated with the washing solution 302 filling the flow path to the three-way joint 304. Here, the flow path switching valve 207 switches the flow path to Inject, and the flowing solvent 201 is passed to the ionization source 114 through the sample loop 206. The syringe pump 204 repeats the drawing and the ejection of the washing solution 203 into the waste receptacle 208 to fill the flow path between the syringe pump 204 and the needle 205 with the liquid and remove the air.

The sample injection operation is started upon the extract container 110 being sent to the sample injection section 301 in a standby state. First, the flow path switching valve 207 switches the flow path from Inject (solid line in FIG. 7) to Load (dotted line in FIG. 7). This connects the syringe pump 204 and the needle 205 with the sample loop 206 in between. The needle 205 is then moved to above the extract container where there is no liquid, and the syringe pump 204 performs a certain draw operation to draw air into the needle 205 through the needle tip (first air layer). The needle 205 is lifted down to move the tip into the extracted sample solution, and the syringe pump 204 performs a certain draw operation to draw the extracted sample solution into the needle 205 through the needle tip. The needle 205 is then lifted up to move the tip out of the extracted sample solution, and the syringe pump 204 performs a certain draw operation to draw air into the needle 205 through the needle tip (second air layer). The tip of the needle 205 is then moved into the washing solution 203, and the syringe pump 204 performs a certain draw operation. This draws the washing solution 203 into the needle 205 through the needle tip, and, at the same time, injects the extracted sample solution between the two air layers into the sample loop 206.

At the completion of the sample injection operation, the flow path switching valve 207 switches the flow path from Load to Inject, and the extracted sample solution is sent to the ionization source 114 by the operation of the passing pump 202. Each component in the extracted sample solution is ionized in the ionization source 114, and sent to the mass spectrometry section 115. In the mass spectrometry section 115, the ionized components are separated for detection according to mass-to-charge (m/z).

The extracted sample solution is sent to the ionization source 114 by being sandwiched between the two air layers. Accordingly, as shown in FIG. 4, the signal intensity rapidly increases upon the transition from the air layer to the extracted sample solution in the ionization source, and rapidly decreases upon the transition from the extracted sample solution to the air layer after a certain time period. The rapid signal intensity decrease is determined by signal processing, and washing of the flow path is started. Specifically, the washing pump 303 is operated to pass the washing solution 302. The washing solution 302 reaches the ionization source 114 through the flow path switching valve 207 and the sample loop 206. Preferably, the washing solution 302 uses a solvent with a strong dissolving power for the contaminating components and the drugs contained in the whole blood in the extracted sample solution. In the present embodiment, the primary contaminating component of the whole blood is the lipid. Because the tacrolimus is a hydrophobic agent, an organic solvent such as 2-propanol and acetone may be used for the washing solution 302.

Because the washing solution 302 is injected with the washing pump 303 and the three-way joint 304 in the middle of the flow path, the flow rate can be increased in the flow path from the three-way joint 304. This increases the velocity of the washing solution 302, and the washing time can be reduced as in First Embodiment in which the flow rate of the passing pump 202 is increased to increase the velocity of the washing solution. Injecting a mixture of the washing solution 302 and the flowing solvent 201 into the ionization source 114 changes the ionization efficiency in the ionization source 114, and the signal intensity obtained in the mass spectrometry section 115 fluctuates. However, this does not affect the result of quantification because the peak area calculations only use the signal intensity from the zero count signal intensity (air layer) to the signal intensity that has decreased to 0 count.

In the present embodiment, the three-way joint 304 is installed between the passing pump 202 and the flow path switching valve 207. However, the three-way joint 304 may be installed between the flow path switching valve 207 and the ionization source 114 to further reduce the washing time, provided that it is certain that the residual contaminating components or drugs occur in the ionization source 114.

REFERENCE SIGNS LIST

101: Sample container
102: Sample holder
103: Solid phase extraction cartridge
104: Processing section
105: Reagent container
106: Reagent installation unit
107: Sample dispensing mechanism
108: Reagent dispensing mechanism
109: Solid phase extraction processing section
110: Extract container
111: Extract container holder
112: Holder
113: Sample injection section
114: Ionization source
115: Mass spectrometry section
201: Flowing solvent
202: Passing pump
203: Washing solution
204: Syringe pump
205: Needle
206: Sample loop
207: Flow path switching valve
208: Waste receptacle
301: Sample injection section
302: Washing solution
303: Washing pump
304: Three-way joint

What is claimed is:

1. A sample injection method for injecting a sample into a mass analyzer, using a sample loop, a container that contains a flowing solvent, a drawing section having a drawing pump, a flow path switching section that switches between (i) a first flow path joining the flowing solvent and the sample loop and a third flow path joining the sample loop and the mass analyzer and (ii) a second flow path joining the drawing section and the sample loop, and a liquid passing section having a passing pump coupled to the flow path switching section, the method comprising:

switching the flow path switching section to the second flow path, to connect the drawing section including the drawing pump to the sample loop, to disconnect the passing pump from the sample loop, and to disconnect the sample loop from the mass analyzer;

drawing the sample, using the drawing section with the drawing pump, into the sample loop with air layers disposed on both sides of the sample, by drawing an air layer on one side of the sample to be drawn, moving a tip of the drawing pump into a sample solution to draw the sample, and lifting the tip of the drawing pump out of the sample to draw another air layer on another side of the drawn sample;

switching the flow path switching section to the first flow path to connect the passing pump to the sample loop and the third flow path to connect the sample loop and the mass analyzer, and to disconnect the drawing section including the drawing pump from the sample loop;

passing the flowing solvent from the container, using the liquid passing section with the passing pump, to the sample loop via the first flow path so as to inject the sample from the sample loop via the third flow path into the mass analyzer with the air layers disposed on both sides of the sample;

producing a signal having signal intensity with the mass analyzer for the injected sample with the air layers disposed on both sides of the sample;

detecting an increase from zero and a decrease to zero of the signal intensity produced by the mass analyzer that respectively corresponds to presence of the air layers disposed on both sides of the sample with respect to the liquid of the sample to determine a start and an end of data collection of the signal produced by the mass analyzer; and analyzing the signal produced by the mass analyzer for mass analysis of the sample disposed between the air layers.

2. The sample injection method according to claim 1, further comprising:
   increasing a velocity of the flowing solvent passed by the liquid passing section when the signal produced by the mass analyzer indicates air of the air layers passing through the mass analyzer.

3. The sample injection method according to claim 1, further comprising:
   injecting a washing solution behind the air layers to inject the washing solution into the mass analyzer behind the sample and the air layers disposed on both sides of the sample.

4. The sample injection method according to claim 3, wherein the washing solution is injected into a flow of the flowing solvent upstream of the flow path switching section, behind the sample and the air layers disposed on both sides of the sample, to be injected into the mass analyzer using the liquid passing section with the passing pump.

5. The sample injection method according to claim 4, wherein the washing solution is injected into the flow of the flowing solvent upstream of the flow path switching section, behind the sample and the air layers disposed on both sides of the sample, using a washing solution pump coupled to a three-way joint disposed between the passing pump and the flow path switching section.

6. The sample injection method according to claim 3, wherein the washing solution is injected into a flow of the flowing solvent downstream of the flow path switching section, behind the sample and the air layers disposed on both sides of the sample, to be injected into the mass analyzer using the liquid passing section with the passing pump.

7. The sample injection method according to claim 3, wherein the washing solution is injected into the flow of the flowing solvent upstream of the flow path switching section, behind the sample and the air layers disposed on both sides of the sample, using a washing solution pump coupled to a three-way joint disposed between the flow path switching section and the mass analyzer.

8. The sample injection method according to claim 1, wherein the drawing pump comprises a syringe pump, wherein the drawing section includes the syringe pump and a needle that are coupled to the second flow path with the sample loop disposed on the second flow path between the syringe pump and the needle when the flow path switching section switches to the second flow path, and wherein the syringe pump is used to draw the sample through the needle into the sample loop and to draw air through the needle into the sample loop to form the air layers disposed on both sides of the sample in the sample loop.

9. The sample injection method according to claim 8, further comprising:
drawing a washing solution, using the syringe pump, into the needle after drawing the sample and the air layers disposed on both sides of the sample into the needle.

10. The sample injection method according to claim 9, wherein the syringe pump is used to draw the washing solution into the needle at the same time the syringe pump draws the sample and the air layers disposed on both sides of the sample from the needle to the sample loop.

11. The sample injection method according to claim 1, wherein the flow path switching section includes a flow path switching valve that connects via the first flow path to the passing pump, connects via the second flow path to the drawing section, connects to both ends of the sample loop, and connects via the third flow path to the mass analyzer, to switch between (i) the first flow path and the third flow path and (ii) the second flow path, so as to inject the sample into the mass analyzer via the third flow path.

\* \* \* \* \*